Sept. 22, 1970   J. J. PAPP   3,529,721
FILTER UNIT WITH BY-PASS VALVE MEANS
Filed Aug. 5, 1968   2 Sheets-Sheet 2

INVENTOR
Janos J. Papp

United States Patent Office 3,529,721
Patented Sept. 22, 1970

3,529,721
FILTER UNIT WITH BY-PASS VALVE MEANS
Janos J. Papp, Toronto, Ontario, Canada, assignor to Purolator, Inc., Rahway, N.J., a corporation of Delaware
Filed Aug. 5, 1968, Ser. No. 750,178
Int. Cl. B01d 27/10, 35/14
U.S. Cl. 210—130                                             12 Claims

ABSTRACT OF THE DISCLOSURE

A filter unit comprising a housing in which is disposed an annular filter cartridge with the housing having oil inlet and oil outlet means adjacent one end thereof, provided with a by-pass or a relief valve means therein, so that the filter cartridge can be by-passed when the cartridge becomes unduly clogged due to the removal of contaminants, and the by-pass valve means comprises a resilient, elongated member and a single, movable part consisting of a piston valve which parts are secured together and are also secured to a retainer member which properly maintains the filter cartridge in its position within the housing.

---

The present invention relates to a filter unit, and more particularly, a filter unit that is used on an engine block and is known as a spin-on or screw-on type filter. The present invention further relates to an oil filter that is commonly known as a throwaway type of filter, which is adapted to be mounted on the engine block of an internal combustion engine, although it is not to be limited to this particular use, since it is apparent that it can be used in many other systems, if desired. However, for purposes of illustration only, the oil filter of the present invention will be described in connection with its use for filtering the oil in an internal combustion engine. In a full flow, throwaway oil filter, the filter element or the filter cartridge generally consists of an annular, convoluted filter element made of pleated paper impregnated with phenolic resin that is sealed within a metal housing or casing.

The casing is provided with a bottom member having a threaded bushing member for screwing onto an adapter bushing secured to the engine block of an internal combustion engine. Resilient sealing means are provided in the bottom member for bearing against an adapter member secured to the engine block so that the filter is sealed with respect to the engine and no oil can leak therebetween. This type of filter is used as a full flow filter and when the filter element permanently sealed within the housing becomes contaminated or clogged with dirt so that it is no longer serviceable, the entire unit is unscrewed from the engine block and thrown away or discarded and a completely new filter is again replaced on the engine block. This type of filter is generally provided with a by-pass valve so that should the filter element permanently sealed therein become clogged, the engine will not be starved of oil since the by-pass valve will open and oil will continue to flow through the inlet and outlet of the filter even though it is not being filtered by the filter element. This type of filter is sometimes provided with an anti-drainback valve which is important where the oil filter operates in an upright position so that the oil will not drain back to the crankcase, but will remain in the filter housing to supply the engine with oil upon initial starting of the engine.

It is an object of the present invention to provide a full flow oil filter unit having a by-pass relief valve that is of simple construction and which can readily be locked or secured in position to a retainer member that normally maintains the filter cartridge in its seated position in the filter housing.

It is another object of the present invention to provide a by-pass valve for a spin-on, throwaway type of filter unit which comprises only two parts, namely, a resilient biasing means for normally holding the by-pass valve in a closed or seated position, and a movable piston member secured to the biasing means.

It is another object of the present invention to provide a by-pass valve for use with a throwaway type, spin-on filter unit, in which a movable piston valve of the by-pass valve means, is provided with indentation means thereon, and a biasing member, to which the piston valve is secured, is provided with resilient tongue means for cooperation with the indentation means, so that the piston valve and the resilient means which normally holds it in a closed position are locked together.

Another object of the present invention is to provide a by-pass valve for a throwaway type oil filter that does not require a coil type spring, but merely a substantially flat arcuate leaf spring for properly securing the piston valve in a seated position.

Still yet another object of the present invention is to provide a by-pass valve for a throwaway type filter unit, having a movable piston valve and resilient means holding the valve in a normally closed position, until a predetermined pressure drop across the filter cartridge is exceeded, and which piston valve is further provided with vane means for preventing the piston valve from improperly seating, and which acts as guide means for the piston valve.

Yet another object of the present invention is to provide a by-pass or relief valve for use in a housing containing a filter cartridge and anti-drainback valve means, in which the by-pass valve means is disposed in the opposite end of the housing from the anti-drainback valve means, so that there will be no interference or restriction of the flow of oil or liquid through the filter housing.

It is yet another object of the present invention to provide a spin-on type filter unit having a by-pass valve means comprising only two parts, namely, a movable piston member that may be made of nylon or other similar material, and a resilient biasing member that is provided with locking means for securing the piston valve to the resilient means, and which resilient means is further of a configuration so that it is adapted to be secured to recess means in a retainer member for holding the filter cartridge in the housing in a proper position, so that the by-pass valve means and the retainer member are normally secured together as a single assembly.

Other objects and advantages of the present invention will be more apparent when considered in connection with the accompanying drawings forming a part thereof, and from the following detailed description, in which.

Figure 3:
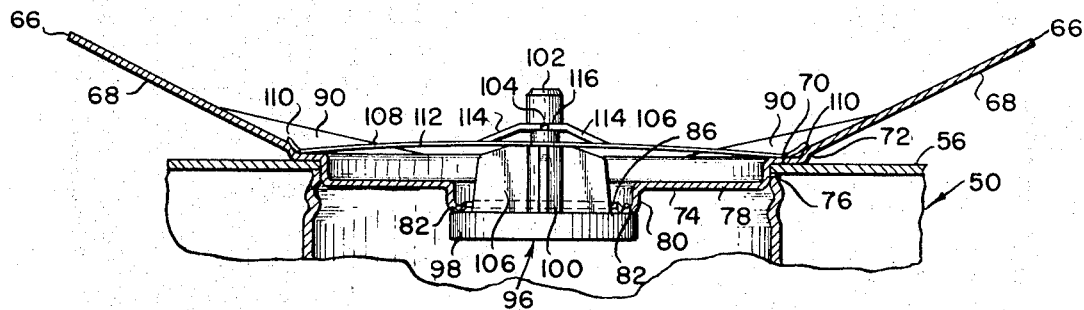
Figure 4:
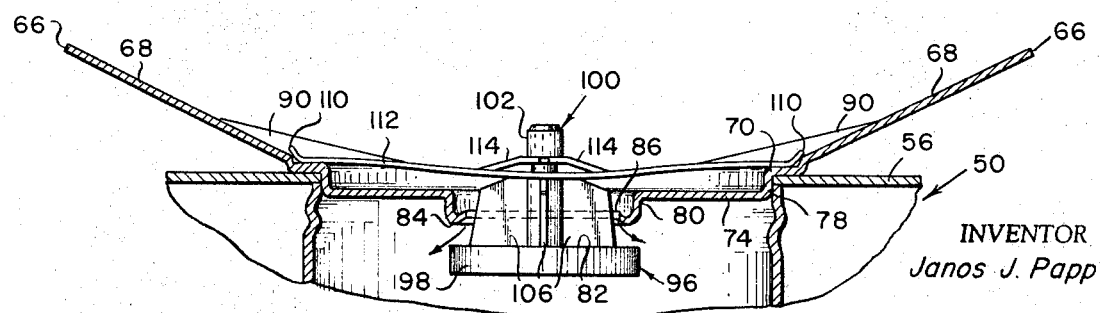

FIG. 3 is a fragmentary detail view of the top portion of the filter cartridge and the retainer member and the by-pass valve means shown in a closed position, when the liquid is being passed through the filter cartridge; and FIG. 4 is a view similar to FIG. 3, but illustrating the by-pass valve means in an unseated position and the oil flow through the filter housing by-passing the filter cartridge and passing through the by-pass valve opening.

Referring to the drawing, the reference numeral 10 generally designates an oil filter or filter unit that is provided with a thin walled cylindrical metal casing or housing 12. The upper end of the casing is provided with a closed, dome-shaped end 14.

The lower end of the casing is open and is provided with a substantially thick bottom or closure member 18 of circular configuration. The bottom member 18 has its outer periphery of sufficient size or diameter so that the bottom member 18 will close off the open end of the casing 12. The bottom member 18 has disposed adjacent its outer side an annular retainer member 20. The retainer member 20 may be secured to the bottom member 18 by any suitable means, such as by tack-welding, spot welding, soldering or any other suitable means. Retainer member 20 is annular in configuration and has a rolled over outer rim 22 which is bent back upon itself, and also locked to a turned up rim 24 on the lower end of the casing 12, so that a rolled seam that is liquid-tight is formed between these two members. The outer periphery of the closure member 18 may be provided with a liquid-tight sealing material between it and the casing 12, or it may be secured thereto by any suitable liquid-tight means.

The retainer member 20 extends substantially in a horizontal direction inwardly of the seam and thereafter is provided with a downwardly extending rib 26 adjacent its inner periphery and terminating in a continuous groove or recess 28 adapted to receive a resilient ring gasket 30.

The ring gasket 30 is adapted to seat against the engine block when the spin-on type filter has been secured thereto, so as to prevent any oil from escaping from between the outer surface of the engine block and the filter housing.

The closure or bottom member 18 extends inwardly in a substantially horizontal direction and thereafter is extended diagonally downwardly, as indicated at 32, and then upwardly and terminates in an upwardly extending, internally threaded bushing 34. The bushing 34 is secured to an adapter, not shown, on an engine block, and forms the oil outlet opening from the housing. The diagonally downwardly extending portion 32 is provided with a plurality of circumferentially spaced oil inlet openings or ports 36, through which the oil to be filtered passes from the engine of an internal combustion engine.

A check valve or anti-drainback valve 38 is disposed around the nipple 34 inside of the bottom member 18. The antidrainback valve comprises a resilient annular member 40 that may be made of rubber or other suitable material, and an annular valve spring member 42, which normally maintains the rubber valve disc 40 in a seated relationship over the oil inlet port until the pressure of the oil unseats the valve. The resilient disc 42 is preferably a well known annular leaf spring member having a plurality of individual fingers adjacent its outer periphery provided by slits in the spring.

A filter cartridge support member 44 is mounted over the bushing 34 and has a lower end which secures the rubber valve disc 40 and a shoulder 46 bearing against the resilient leaf spring 42, so as to secure the anti-drainback valve 38 in its proper position over the oil inlet ports 36. The filter support member 44 is substantially a vertical sleeve and has an annular rib 48 adjacent the upper end thereof, which terminates in an outwardly extending rim 51, on which is disposed the lower end of a filter cartridge 52.

The filter cartridge 52 is of a generally well known pleated paper type of filter, having a plurality of individual pleats 53 therein, and is impregnated with phenolic resin. The filter cartridge is provided with annular end caps 54 and 56 sealing off the opposite ends of the pleats. The inner ends of the pleats 53 abut a perforated center tube 58.

Figure 1:
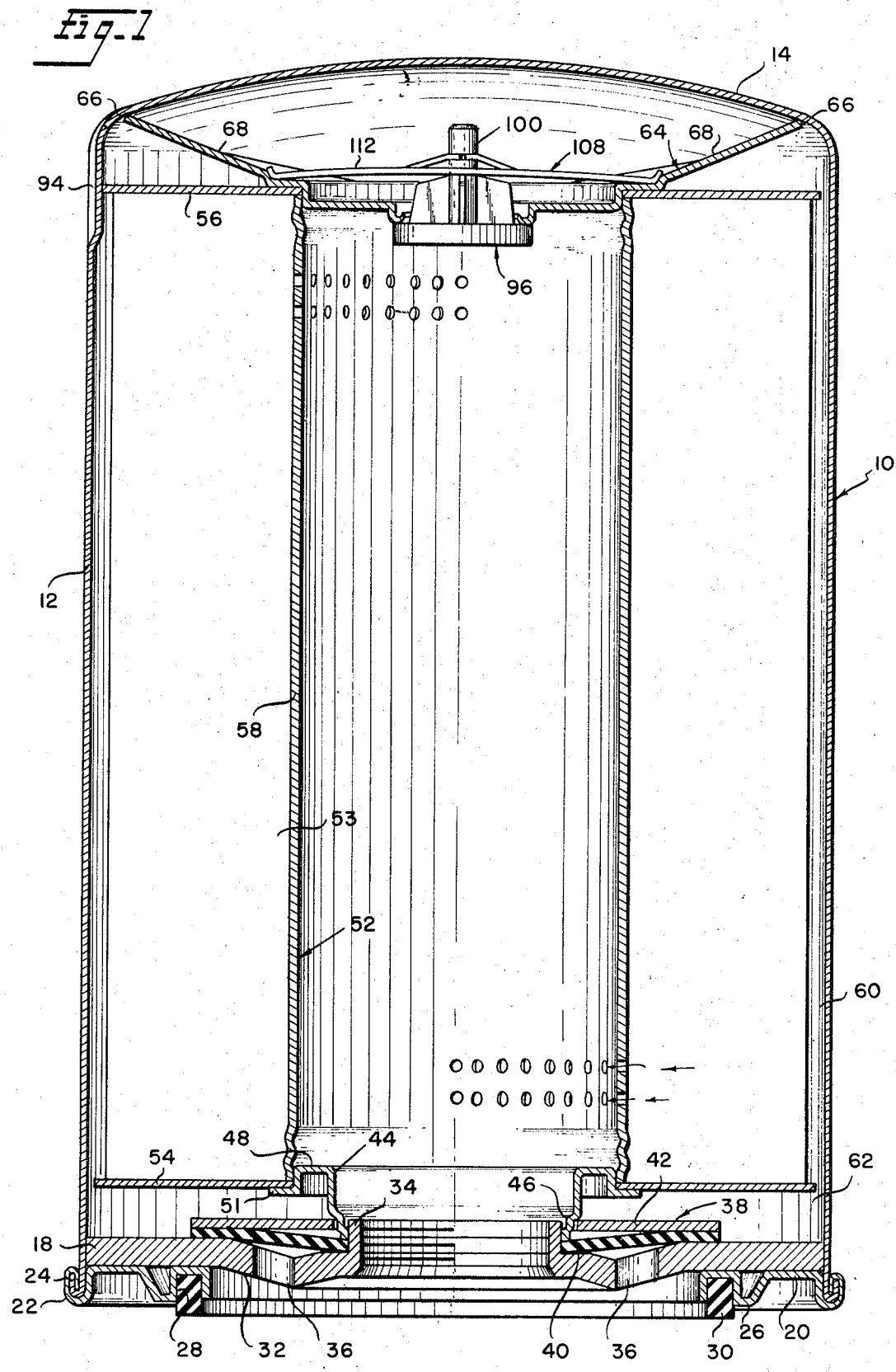
FIG. 1 is a vertical section taken through the oil filter unit which embodies the present invention.

The filter cartridge has its outside diameter or periphery spaced from the inner wall of the casing 12 so that an annular chamber 60 is provided between the pleats and the casing so that oil, as it passes through the oil inlet ports 36, and through the oil inlet chamber 62 adjacent thereto, will thereafter flow upwardly in the annular chamber 60, and thereafter pass in an outside in direction, as indicated by the arrows in FIG. 1, through the filter pleats.

The filter cartridge 52 is maintained seated on the annular rim 51 by a retainer member 64, disposed in the upper end of the housing, between the dome 14 and the upper end cap 56. The retainer member 64 is substantially rectangular in configuration, when looking at it from the top plan view, as best seen in FIG. 3, and it has its opposite ends 66 curved in a circular configuration so that they conform to the cylindrical configuration of the housing 12. The end portions 68 of the retainer member are further bent upwardly at an approximately 45 degree angle from the horizontal, as best seen in FIG. 3, and is provided with a substantially horizontal annular rim portion 70 adjacent the inner edges 72 of the end portions 68. Thereafter, the retainer member has a counter sink 74 in its central portion formed by a vertical leg 76 and a horizontal annular portion 78 extending inwardly of the lower end of the leg 76. Adjacent the inner end of the horizontal portion 78, the retainer member extends vertically downwardly as indicated at 80, and thereafter inwardly as indicated at 82, so as to form a rib 84 and a central opening in the center of the retainer member to provide an oil by-pass port therein.

The retainer member is made of sheet metal and is further provided with upwardly bent side portions 88 that are bent in such a fashion as to provide triangular sections 90 and another section 92 therebetween or centrally between the two triangular sections 90. Referring to FIG. 3, the cross-sectional configuration of the retainer plate can be more readily ascertained therefrom, and it will be noted that the bent up sections 90 are not as pronounced as the curved end sections 66. The configuration of the retainer member is such that it presses downwardly against the end cap 56 through its annular rim 70 so as to keep the filter cartridge properly seated on the filter support member. The upper end of the filter cartridge is properly spaced from the side walls of the housing 12 by a plurality of flats 94, one of which can be seen in FIG. 1, so that the filter cartridge is at all times properly positioned for the flow of oil therethrough when the filter unit has been screwed onto the engine block of an engine.

The by-pass valve means of the present invention comprises a nylon piston valve 96 having a circular valve disc 98, with a vertical cylindrical piston valve stem 100, having an enlarged head or end 102, with a circumferential groove 104 therebelow, and above a plurality of circumferentially spaced vertical vanes 106. The vanes 106 are set back somewhat from the periphery of the circular valve disc 98, as best seen in FIGS. 3 and 4, and are tapered or inclined inwardly and upwardly. The vanes 106 are adapted to prevent the valve from tipping inadvertently, and act as guide means should the valve become improperly tipped to one side, as the valve is operated, as described hereinafter.

Referring to FIG. 3, an elongated, rectangular leaf spring 108 is provided for normally maintaining the piston valve in a seated or closed position. The leaf spring 108 is disposed to extend transversely of the counter sink 74 and has its opposite ends seated on the opposite sides of the rim 70. The opposite edges of the leaf spring 108 are bent upwardly, as indicated at 110, and the leaf spring is arched or has an arcuate configuration, as indicated at 112, between these edges 110, as best seen in FIG. 3. The center of the leaf spring is further provided with two spaced upwardly extending tongues or ears 114 adapted to have their inner edges 116 extend into the continuous circumferential groove 104 of the piston valve stem 100, so that the resilient leaf spring 108 is locked or secured to the piston valve 96 by these resilient tongues 114, as clearly shown in FIGS. 3 and 4. The flexed leaf spring 108, when disposed on the annular rim 70, securely locks the leaf spring 108 itself, as well as the piston valve to the retainer member 64. The resilient spring 108 further urges the valve disc 98 into a closed or seated position bearing against the rib 82 of the by-pass oil port or opening 86. This can be readily seen by observing the view shown in FIG. 3.

In operation, when the spin-on type filter has been properly secured to the engine block of an internal combustion engine, the oil normally flows through the oil inlet ports 36 and the oil pressure causes the anti-drainback valve 38 to unseat, so that the incoming oil will flow into the chamber 62 and thereafter flow up into the annual chamber 60 and pass in an outside in direction, as indicated by the arrows in FIG. 1, through the pleats of the filter cartridge so that dirt and contaminants are removed therefrom. Thereafter, the oil will flow downwardly through the center tube and out of the opening outlet formed by the bushing 34.

Figure 2:
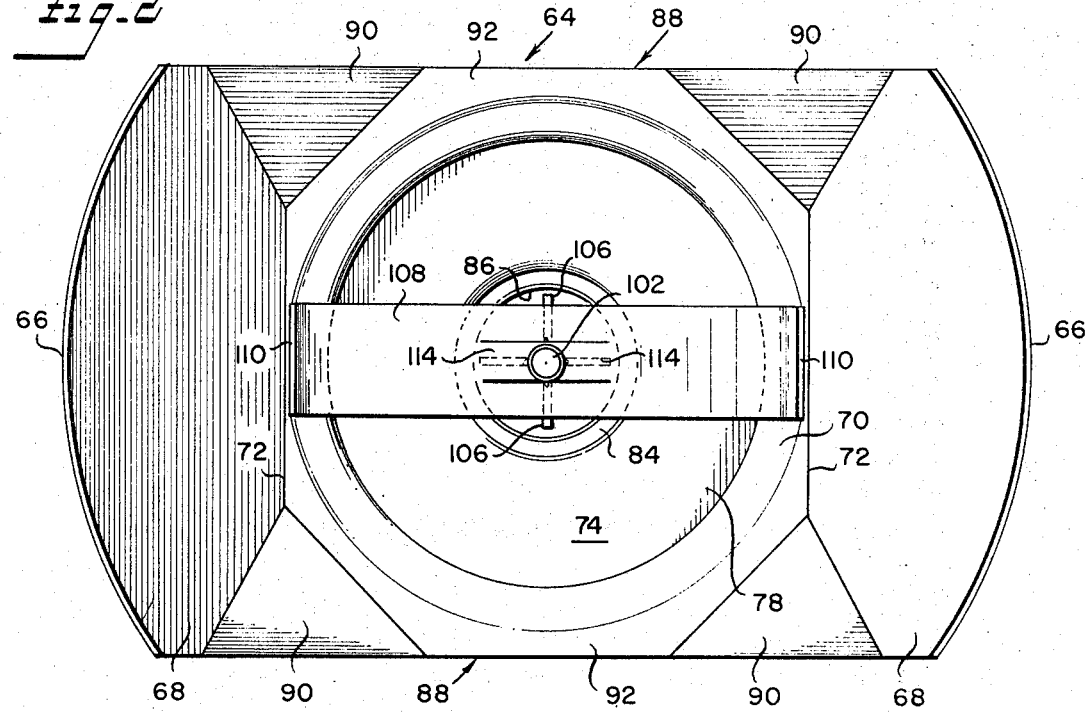
FIG. 2 is a top plan view of the by-pass valve means and the retainer member shown in FIG. 1.

When the oil pressure across the filter cartridges increases beyond a predetermined value, because the oil flowing through the oil filter is either cold, such as in cold starting of an engine, or when the oil filter cartridge becomes clogged from dirt, or for any other reason, the oil passing through the oil filter housing and the annular chamber 60 will flow upwardly into the housing and around the sides of the side portions 88 of the cartridge retainer member since the casing 12 of the oil filter housing is cylindrical in configuration, and the retainer member is less than a full cylindrical configuration, but is elongated, as best seen in FIG. 2, and of rectangular configuration. It is obvious that the side edges of the retainer member 66 are in spaced relationship with the inner surface of the cylindrical housing so that there is plenty of area for the oil to flow up and around the side edges of the retainer member. Thereafter, the oil pressure will act against the upper surface of the piston valve and when the force acting on the upper surface of the piston valve is greater than the force in the leaf spring 68 maintaining the valve disc 98 seated, as shown in FIG. 3, this additional force in the oil passing through the filter housing will cause the valve disc 98 to become unseated or open. Thereafter, the valve disc 98 will assume its open position, as indicated in FIG. 4, and the leaf spring 108 will be flexed into the position shown in FIG. 4, and the oil will by-pass the filter cartridge and flow through the by-pass opening 86, in the direction indicated by the arrows in FIG. 4, so that the engine will at no time be starved of oil, even though the filter may be clogged, or upon cold starting of an engine, when the viscosity of the oil will not permit sufficient quantity to flow through the cartridge.

Thus, from the foregoing description, it is apparent that the present invention provides a novel by-pass or relief valve for a throwaway filter in which a nylon piston valve is locked to a flexed resilient spring member, and both the piston valve and the leaf spring in turn are locked to a retainer member for a filter cartridge in the filter housing.

Since various changes can be made in the relative arrangement and the location of the various parts of the invention without departing from the spirit and the scope of the invention, it is certainly no meant to limit this invention except by the scope of the appended claims.

What is claimed is:

1. A spin-on type oil filter unit comprising a cylindrical housing with a closed end and an open end, a closure member secured to said open end having a central threaded oil outlet bushing therein and oil inlet means surrounding said bushing whereby said filter unit can be threaded onto an engine, an annular filter support member disposed around said bushing for seating a filter element thereon, an annular filter element seated on said member with center tube means extending therethrough, a retainer member disposed in the upper portion of said tube means and between said closed end and the top of said filter element and bearing against said filter element to maintain it in a seated position on said filter support member, said retainer member closing off said center tube means and having by-pass port means therein, piston means secured to said retainer member and seated over said port means to normally prevent oil from by-passing said filter element, and resilient biasing means urging said piston means closed over said port means and locking means on said resilient means securing said piston means to said retainer means, and said biasing means to said retainer means.

2. The filter unit of claim 1 wherein said resilient biasing means comprising an elongated leaf spring and said piston means is a valve disc with a piston rod thereon.

3. The filter unit of claim 2 wherein said locking means includes resilient tongue means adapted to engage said piston rod.

4. The filter unit of claim 3 wherein said leaf spring is arcuate in configuration and said tongue means includes two spaced apart resilient members extending upwardly from the top surface of said leaf spring.

5. The filter unit of claim 4 wherein the opposite ends of the leaf spring are bent upwardly.

6. The filter unit of claim 5 wherein said piston means is provided with vane means for preventing said valve disc from tipping.

7. The filter unit of claim 6 wherein said vane means comprises radially extending tapered vertical members joined to said valve disc and piston rod.

8. The filter unit of claim 7 wherein said retainer member is provided with a central circular portion and said by-pass port means is an opening in the center of said circular portion.

9. The filter unit of claim 8 wherein said retainer member has upwardly extending end portions with said central circular portion disposed therebetween.

10. The filter unit of claim 8 wherein said filter element is annular and said circular portion of said retainer member closes off one end of said annular filter element and said housing is cylindrical, and said retainer member is substantially elongated in plan and less in area than the cross-sectional area of said cylindrical housing.

11. The filter unit of claim 8 wherein said retainer member is substantially elongated in plan and less in area than the cross-sectional area of said cylindrical housing.

12. The filter unit of claim 11 wherein said retainer member is substantially rectangular and spaces are provided on opposite sides of said retainer member and between the inner surface of said cylindrical housing.

References Cited
UNITED STATES PATENTS 3,224,591  12/1965  Sawyer _____ 210—443 X
3,322,281  5/1967  Gulick _____ 210—443 X REUBEN FRIEDMAN, Primary Examiner F. A. SPEAR, Jr., Assistant Examiner U.S. Cl. X.R.

210—440, 443